(12) United States Patent
Dubach

(10) Patent No.: US 8,152,015 B2
(45) Date of Patent: Apr. 10, 2012

(54) SEMI-FINISHED PRODUCT FOR PRODUCING A PLASTIC CLOSURE FROM TWO PARTS

(75) Inventor: Werner Fritz Dubach, Maur (CH)

(73) Assignee: Deltona Innovations AG, Maur (CH)

( * ) Notice: Subject to any disclaimer, the term of this patent is extended or adjusted under 35 U.S.C. 154(b) by 327 days.

(21) Appl. No.: 12/311,131

(22) PCT Filed: Sep. 20, 2007

(86) PCT No.: PCT/CH2007/000461
§ 371 (c)(1),
(2), (4) Date: Mar. 19, 2009

(87) PCT Pub. No.: WO2008/037100
PCT Pub. Date: Apr. 3, 2008

(65) Prior Publication Data
US 2009/0277903 A1   Nov. 12, 2009

(30) Foreign Application Priority Data
Sep. 26, 2006   (CH) ........................... 1530/06

(51) Int. Cl.
*B65D 51/00*   (2006.01)
*B65D 5/74*   (2006.01)
*B29C 45/00*   (2006.01)

(52) U.S. Cl. ............ 220/212; 264/238; 215/228
(58) Field of Classification Search ............... 220/265, 220/257.1, 256.1, 254.8, 254.1; 215/251, 215/253, 200; 222/153.1, 153.09, 541.6, 222/541.3, 541.4, 541.1; 264/268; *B65D 41/34, B65D 5/74; B29C 45/00*
See application file for complete search history.

(56) References Cited

U.S. PATENT DOCUMENTS

| | | | | |
|---|---|---|---|---|
| 4,630,743 A | * | 12/1986 | Wright | 215/216 |
| 5,174,465 A | * | 12/1992 | Luch et al. | 220/288 |
| 5,271,519 A | * | 12/1993 | Adams et al. | 220/375 |
| 5,810,184 A | * | 9/1998 | Adams et al. | 215/45 |

FOREIGN PATENT DOCUMENTS

| | | |
|---|---|---|
| EP | 0 502 716 A | 9/1992 |
| WO | WO 99/00308 | 1/1999 |
| WO | WO 01/74683 A1 | 10/2001 |
| WO | WO 2004/041669 A1 | 5/2004 |

* cited by examiner

*Primary Examiner* — Anthony Stashick
*Assistant Examiner* — Robert J Hicks
(74) *Attorney, Agent, or Firm* — Pauley Petersen & Erickson

(57) ABSTRACT

A semi-finished product for the rational manufacture and assembly of a two-part closure of a spout element and of a screw cap. The spout element and the screw cap are manufactured as one piece in a coherent manner via breakage bridges. Tooling costs for injection mold tools are thus saved, and the assembly of the closure of the semi-finished product is simplified because of the defined, radial alignment of both parts.

13 Claims, 4 Drawing Sheets

SEMI-FINISHED PRODUCT FOR PRODUCING A PLASTIC CLOSURE FROM TWO PARTS

BACKGROUND OF THE INVENTION

1. Field of the Invention

This invention relates to a semi-finished product for the manufacture of a plastic closure of two parts, including a spout element as a first part with a flange fastenable onto a container, and a spout with an outer thread present on its cylindrical spout wall, and a screw cap as a second part, with a cover surface and an inner thread for the closure of the spout.

2. Discussion of Related Art

Two-part plastic closures which include a spout element as a first part and a screw cap as a second part are mass-produced products which are usually attached to soft packaging. Thus, these closures are manufactured in incredibly high numbers. Accordingly, the demands with regard to possible cost savings are enormously high. Costs may be saved, for example, by reducing the number of injection molds, and also by simplifying the assembly method, which thus may be realized in a quicker manner as with simpler assembly machines.

It is obvious to manufacture the two parts of such a plastic closure as a single-part semi-finished product, in order to produce both parts in a single injection mold. Thus, it is possible to proceed from the basic concept of injecting the two parts as one piece positioned over one another in the position correct for assembly, wherein the two parts are connected to one another via breakage bridges. The inner diameter of the two parts arranged over one another, with regard to their inner diameter, must be designed so that the core can be pulled out of the plastic part. In order to permit this, with the previous solutions, the screw cap has been designed such that it includes an outer thread, and the flange element a corresponding inner thread, so that the screw cap has the shape of a peg. The core can extend through the flange element up to the cover surface of the screw cap, and simultaneously the lower edge of the screw cap can be connected to the upper edge of the spout wall via breakage locations. Such solutions are known form various patent documents. European Patent Reference EP-A-502 716 shows such a solution for example.

Plastic closures of this type are hardly accepted on the market. Such solutions may hardly be aesthetically pleasant, and also such closures are not hygienically acceptable. With each pouring activity, the inner thread of the flange element comes into contact with the fluid. If the screw cap is then placed on again and rotated to close, then for example, contrary to what is mistakenly assumed, the thread is not practically scraped in a self-cleaning manner, but rather the material is pressed in the thread flight to the top and to the outside due to certain tribological characteristics when screwing closed. Accordingly, the closure is completely soiled after being used several times. Also, after the opening, one would often want to place the screw cap somewhere, in order with the one hand to hold the receptacle, from which one wishes to pour out, while with the other hand one then holds the receptacle into which to pour out the fluid, or for example with foodstuffs, one holds a spoon or whisk with the other hand. In order to deposit the closure somewhere in the meanwhile, as a result one must place it upside down, wherein the soiled part projects upwards. With reclosure, it is impossible to grip the closure, without contacting the soiled threaded region. This is unpleasant, and also one contaminates the remainder of the foodstuff which is present on the screw thread, and brings this into contact with the contents of the receptacle when closing the closure again. It is because of these considerations that such two-part closures with which the screw cap is screwed into the spout out in a peg-like manner, have not succeeded on the market.

These closures are used on typical drinks containers. The user screws off the screw cap and leads the flange element directly to the mouth. Thus, for hygienic reasons, the spout element is thus protected by the screw cap. A peg-like screw cap may not fulfill this hygienic demand.

It is impossible to manufacture screw caps with inner threads and flange elements with outer threads on the outer wall, as one piece, according to the previous teaching, because the inner diameter of the screw cap is necessarily larger than the outer diameter and most certainly than the inner diameter of the cylindrical spout of the flange element. Accordingly, these two parts may not be manufactured as one piece such that breakage locations are incorporated between the lower edge of the screw cap and the upper edge of the cylindrical spout, and these are manufactured as one piece, because the two-part plastic closure may no longer be removed from the mold.

SUMMARY OF THE INVENTION

It is one object of this invention, taking into account the mentioned considerations, to provide a solution which still permits a single-part manufacture of the two closure parts and also cheapens the assembly in comparison to the assembly of an equal closure with a two-part manufacture.

The above object is achieved with a semi-finished product for the manufacture of a plastic closure according to this invention and the two parts are connected to one another via breakage bridges, such that the breakage bridges extend from the cover surface of the cap to a part of the spout element.

With this apparently contradictory arrangement, it is not possible to assemble the two parts by merely pushing together, as with all solutions of the known art. Despite this, the solution has considerable economic advantages, because only a single injection mold is required for both parts, and because the assembly method is considerably simplified, and accordingly, less expensive assembly devices are required.

BRIEF DESCRIPTION OF THE DRAWINGS

Two preferred embodiments of this invention are shown in the drawing, and are explained by the subsequent description, wherein.

DETAILED DESCRIPTION OF THE INVENTION

Figure 1:
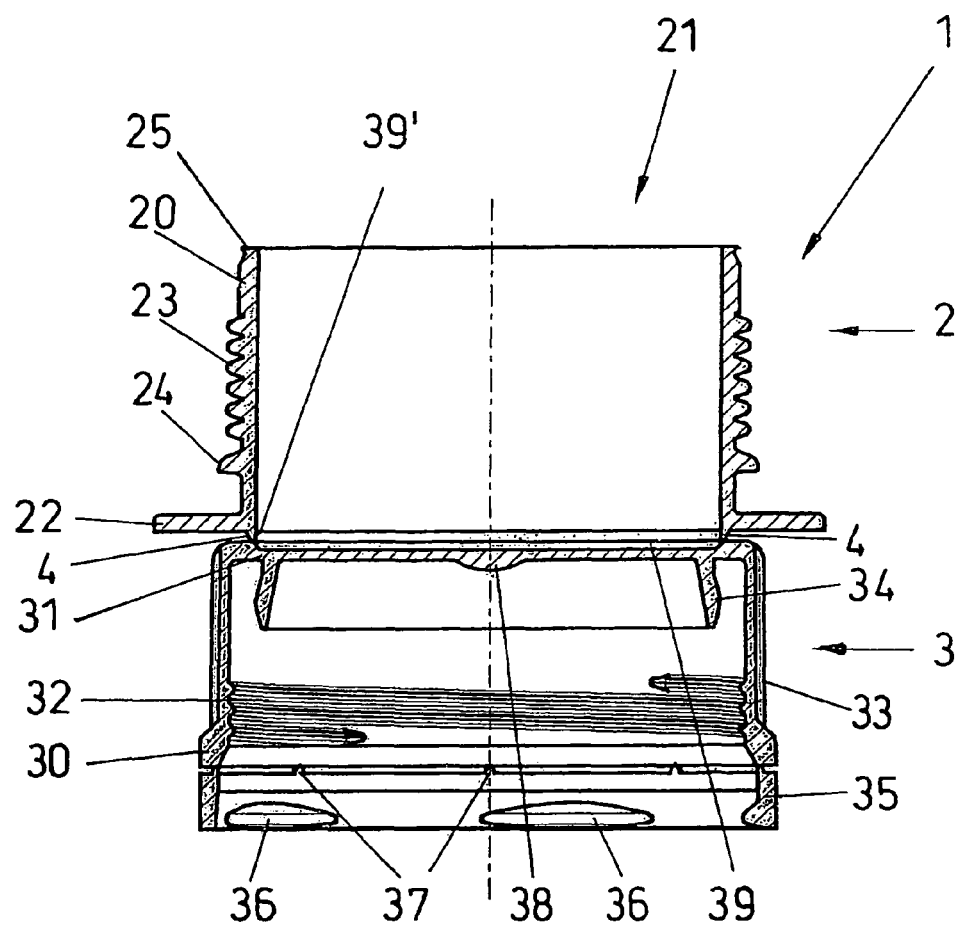
FIG. 1 shows a first embodiment of the semi-finished product according to this invention, in an axial longitudinal section, which runs through the breakage bridges.

A first embodiment of a semi-finished product which in its entirety is indicated at element numeral 1, is shown in a longitudinal section in FIG. 1. The semi-finished product 1 includes two parts manufactured as one piece, specifically of a spout element 2 and of a screw cap 3. The spout element 2 has a cylindrical wall 20, which forms the actual spout 21, and an end flange 22. The cylindrical spout wall 20 has an outer thread 23. Additionally, a peripheral retaining bead 24 may be provided on the cylindrical spout wall 20 below the outer thread 23. The retaining bead 24 serves as an undercut for a guarantee element which is possibly integrally formed on the screw cap 3. The cylindrical spout wall 20 may finally be provided with a specially designed spout edge 25, which permits a drip-free pouring out.

The screw cap 3 has a skirt wall 30, which is essentially cylindrical and is terminated at the top by a cover surface 31. The skirt wall 30 on the inner side comprises an inner thread 32. The skirt wall 30 on the outer side may be provided with ribs 33 or other means, which increase the grip of the screw cap 3. On the lower side, the cover surface has a peripheral annular wall which serves as a sealing peg 34 and in the closed condition of the closure comes to bear on or contacts the inner side of the cylindrical spout wall 20. In the example shown, which represents the normal case, a guarantee strip 35 is integrally formed below the skirt wall 30. Elongate retaining naps 36 are integrally formed on the inner surface of the guarantee strip 35 and in the assembled condition before opening for the first time, have a positive fit connection to the retaining bead 24 of the spout element 2. The connection between the guarantee strip 35 and the skirt wall 30 is effected via several second breakage bridges 37. Centrically arranged, one yet may recognize a thickening 38 on the underside 31 of the cover surface.

The two parts of the semi-finished product 1, specifically the spout element 2 and the screw cap 4, are connected to one another via first breakage bridges. These breakage bridges are generally the connection between the spout element 2 and the cover surface 31 of the screw cap 3. Seen in detail, the breakage bridges 4 may be integrally formed at different locations. In the present case which represents a preferred embodiment, the first breakage bridges 4 are arranged on the side of the spout element 2 in a manner which is directly flush with the inner edge of the cylindrical spout wall 20. The screw cap 3 has a central recess 39, whose diameter corresponds to the inner diameter of the spout 21. On the screw cap side, the first breakage bridges 4 are integrally formed on the peripheral edge 39' of the central recess 39. Breakage bridges result due to this type of connection, which have a great notch effect and thus may be particularly well separated. With this design, the breakage bridges 4 may either be very small, or there may be very few, but wider breakage bridges.

Figure 2:
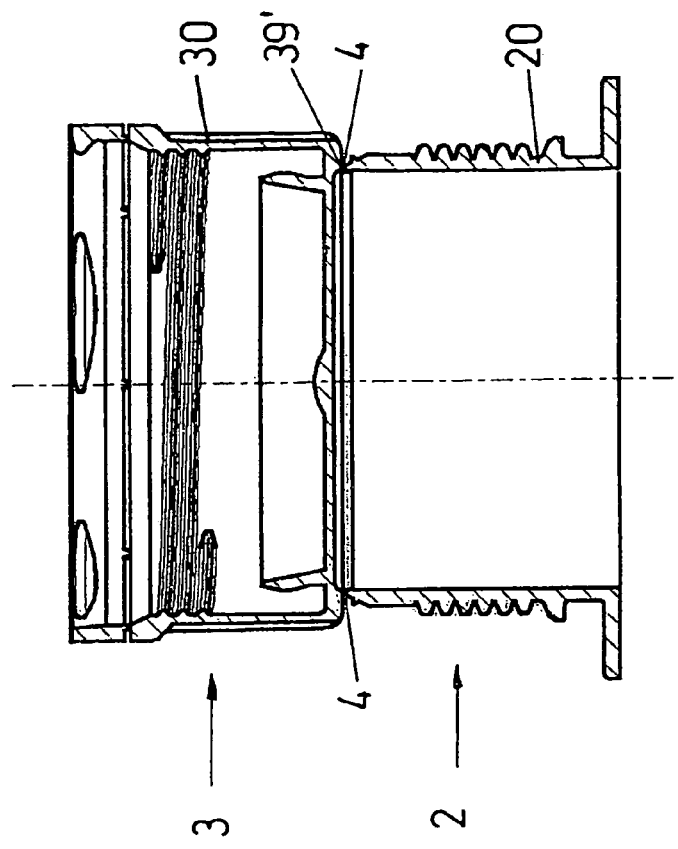
FIG. 2 shows a second embodiment of the semi-finished product manufactured of one piece, again in a vertical axial longitudinal section.
Figure 3:
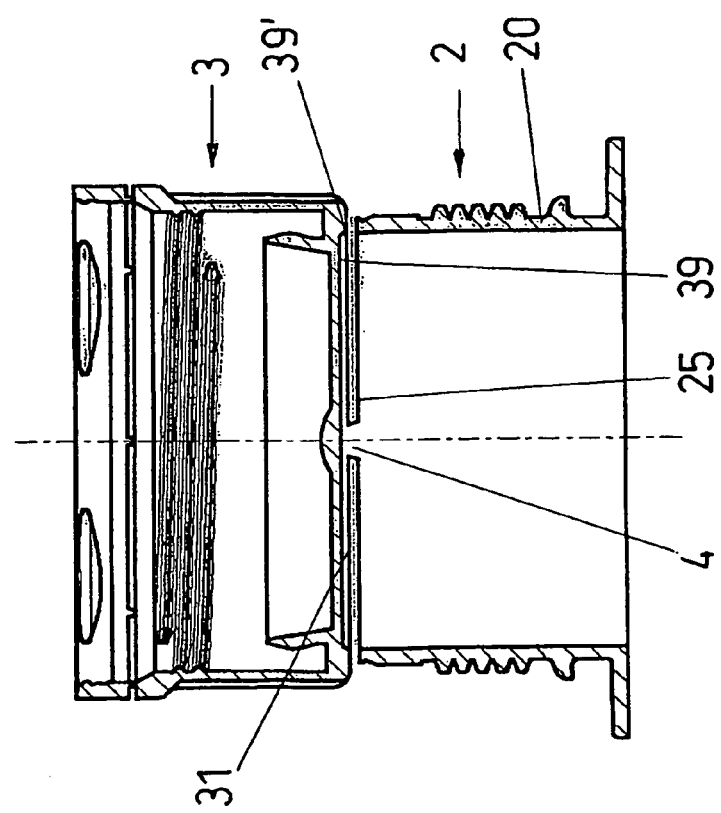
FIG. 3 shows the solution according to FIG. 2, rotated about 90°, so that a section plane is taken through the breakage bridges.

A further design of the semi-finished product is shown in FIGS. 2 and 3. The spout element on the flange side was previously represented and described connected via breakage locations 4 to the cover surface 31 of the screw cap 3. In this embodiment, the connection between the spout element 2 and screw cap 3 is realized via breakage locations 4 between the spout side and the cover surface 31 of the screw cap 3. With regard to the manufacture, the solution according to FIG. 1 is similar to that of FIGS. 2 and 3. The difference between these two embodiments is that depending on the embodiment, the method for the assembly is different, in order to manufacture an assembled plastic closure from the semi-finished product. This is dealt with not until the description of the FIGS. 6 and 7. Here too, the screw cap 3 comprises an elongate recess and the first breakage locations 4 engaged on the screw cap side, again on its peripheral edge 39'. On the side of the spout element 2, the breakage bridges are integrally formed flush with the inner side of the cylindrical spout wall 21. Whereas in FIG. 3, the first breakage bridges 4 lie in the section plane and are therefore sectioned, FIG. 3 shows a representation rotated by 90°, so that a first breakage bridge 4 is completely evident. Most preferably, one would only provide two first breakage bridges which are arranged lying diametrically opposite one another. The selection of merely two first breakage bridges 4 is preferred, since particularly simple injection molding tools may be thus realized, which make do with only two sliders or mold slides. If these two slides are pushed outwards with respect to the middle axis after the injection molding procedure, then the plastic part is set free to the outside, and the cores which are present in the inside can be pulled out without any problem, wherein the outer walls may spring radially outwards to the necessary extent, without the first and the second breakage locations 4 and 37 respectively, tearing on mold removal. Also, in FIG. 2 the width of the first breakage bridges is longer than the height. The height of the first breakage bridges 4 is the longitudinal extension of this from the peripheral edge 39' to the spout edge 25. The length of such a first breakage bridge 4 is about double to fourfold its height.

Figure 5:
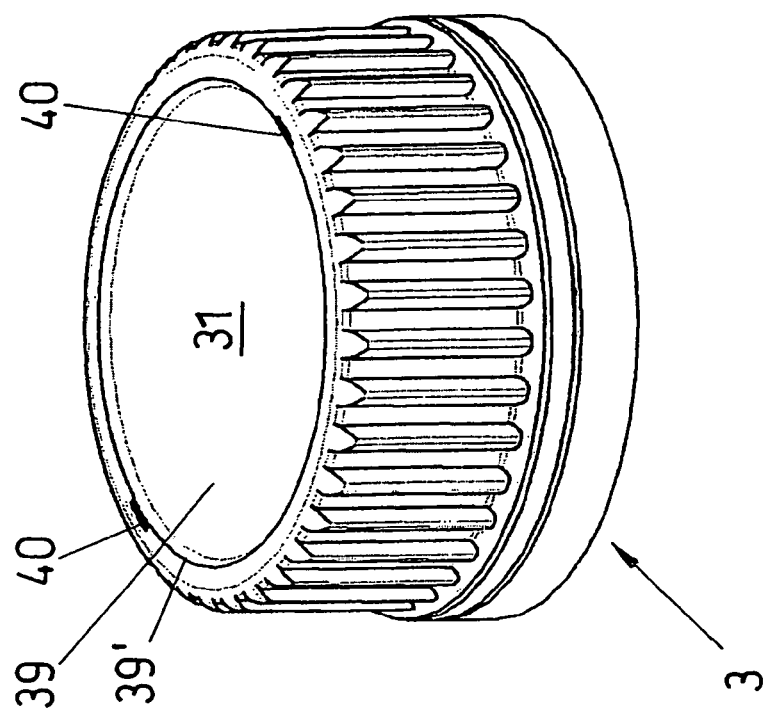
FIG. 5 shows a screw cap in a perspective representation after separation of the semi-finished product.
Figure 4:
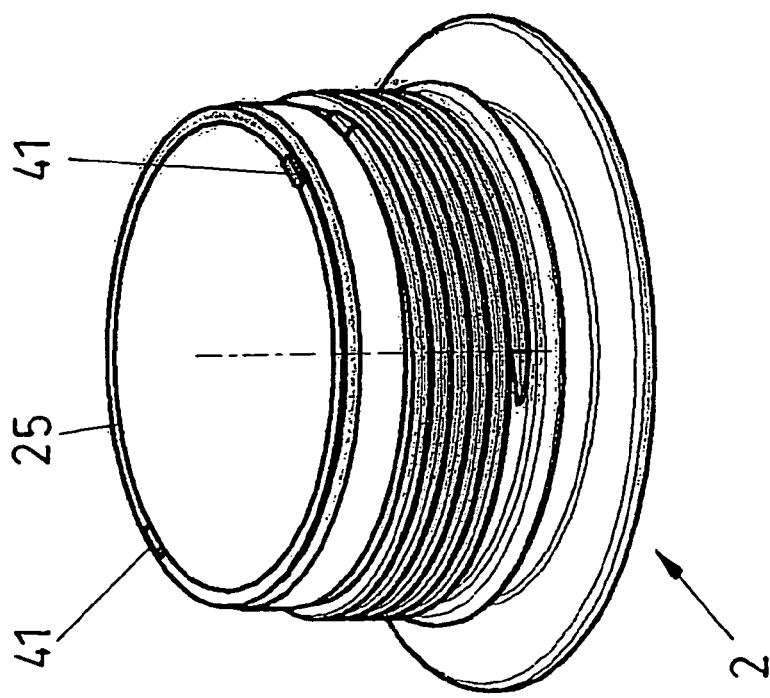
FIG. 4 shows a perspective view of a pour-pout element after separation of the semi-finished product.

The semi-finished product is represented after the separation in FIGS. 4 and 5. FIG. 4 shows the spout element of an embodiment according to FIGS. 2 and 3, whereas FIG. 5 shows the screw cap in a perspective view from the top, wherein this view corresponds to the design according to FIG. 1 as well as to that of FIGS. 2 and 3. Typical of such a plastic closure which has been produced from a semi-finished product according to this invention, are the clearly visible separating locations 40 which are on the outer side of the cover surface 31 of the screw cap 3 and which here, according to the embodiment according to FIGS. 2 and 3, are visible when the spout element 2 and the screw cap 3 are separated from one another. Equal and opposite separating locations 41 are also recognized on the spout element 2. The separating locations 41 are located in FIG. 4 on the spout edge 25 of the spout element 2.

Figure 6:
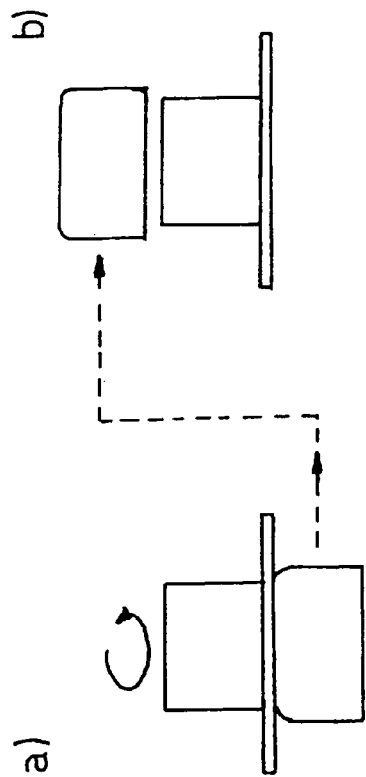
FIG. 6 schematically shows a first variant of the method for assembly of a closure of a semi-finished product according to this invention.

In order to realize a commercial plastic closure from the semi-finished product according to this invention, as previously described, the single-piece semi-finished product may be assembled in a suitably designed assembly device or assembly line in different steps. Such a method according to a semi-finished product as represented in FIG. 1, is symbolically shown in FIG. 6. The semi-finished product in a first step is held on both parts, specifically the spout element 2 and the screw cap 3, whereas the first breakage locations 4 are separated by rotation of at least one of the two parts relative to the other, as shown in FIG. 6a. Because both parts have been injected in a very particular predefined rotation position to one another, and both parts are firmly held on separation, this rotation position also is retained, wherein either only the two parts need to be rotated back into the initial relative position, or by way of the rotation being effected by a predefined angle which is fixed by the installation and thus likewise the relative rotation position of the two parts in the assembly line is known. In a step b, now the axial positions of the two parts are exchanged, so that the screw cap 3 lies over the spout 21 of the spout element. Then, as is illustrated in c, in the next step, the screw cap as is done conventionally, is either screwed on or knocked on, wherein then the inner thread of the screw cap slides over the outer thread of the spout element in a ratchet-like manner.

Figure 7:
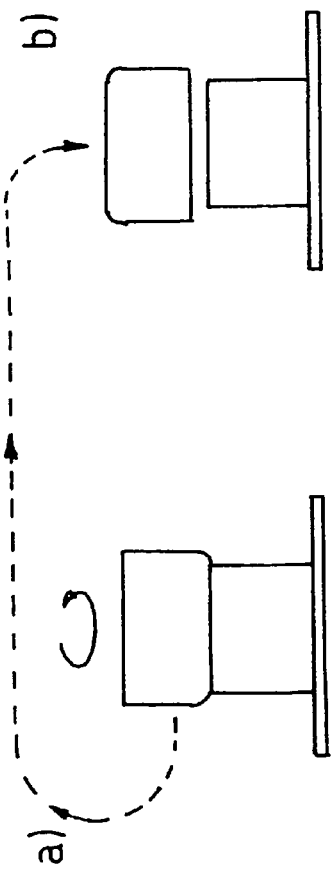
FIG. 7 shows a variant of this method.

With the design of the method according to FIG. 7, the solution is represented in FIGS. 2 and 3. The step a remains the same, in which the two parts 2 and 3 are rotated relative to one another and thus the first breakage bridges are severed. In the next working step, from now, only the screw cap 3 is inverted, so that the opening of the screw cap is aligned to the spout of the spout element. This is represented under b. With this manipulation, the screw cap comes to lie on the spout element 2 in a manner rotated by 180°. Accordingly, one would realize the semi-finished product such that with the respective manipulation, the screw cap and the spout element come to lie to one another in an exact angularly correct manner, in order then in step c to screw or knock the screw cap back on again.

The concept of this invention completely contradicts the usual arrangements of such elements, which are realized as a semifinished product and must be joined together thereafter. In the present case however, a single-part manufacture in a position which is suitable for the direct assembly is not possible. Accordingly, the man skilled in the art would not consider a single-part manufacture. This invention however assumes that on assembly, with a two-part manufacture, the two parts must likewise be brought in certain relation positions axially and radially to one another, in order to then be able to be assembled. However, with a single-part manufacture, the radial alignment is not necessary, since the radial alignment of the parts has already been considered on manufacture. Thus, such assembly lines may be realized in a significantly less expensive manner. Added to this is the already mentioned advantage that a single-part manufacture is cheaper and quicker and demands less capacity of the injection molding machine.

The invention claimed is:

1. A semi-finished product (1) for manufacture of a plastic closure of two parts, including a spout element (2) as a first part, with a flange (22) fastenable on a container and with a spout (21) with an outer thread (23) on a cylindrical spout wall (20), and a screw cap (3) as a second part with a cover surface (31) and an inner thread (32) for closing the spout element (2), the semi-finished product comprising the two parts (2, 3) connected to one another via first breakage bridges (4) with the first breakage bridges (4) extending from the cover surface (31) of the screw cap (3) to the spout element (2).

2. A semi-finished product according to claim 1, wherein the first breakage bridges (4) run from the cover surface (31) of the screw cap (3) to an upper end of the spout wall (20) which is distanced further from the flange (22).

3. A semi-finished product according to claim 1, wherein the first breakage bridges (4) run from the cover surface (31) of the screw cap (3) to a lower end of the spout wall (2) which is close to the flange (22).

4. A semi-finished product according to claim 1, wherein the first breakage bridges (4) run from the cover surface (31) of the screw cap (3) to the lower surface of the flange (22) near the spout wall (20).

5. A semi-finished product according to claim 1, wherein the cover surface (31) of the screw cap (3) has a centric recess (39) with a diameter that corresponds to an inner diameter of the spout (21), and the first breakage bridges (4) are arranged flush with an edge (39') of the centric recess (39).

6. A semi-finished product according to claim 1, wherein the screw cap (3) on a skirt wall (30) via second breakage bridges (37) comprises an integrally formed guarantee element (35).

7. A semi-finished product according to claim 5, wherein a method for assembly of a plastic closure includes one part held or guided secure against rotation, the other part (2, 3) gripped, and the two parts (2, 3) rotated relative to one another for separating the first breakage bridges (4) and moved and held relative to one another while retaining a radial orientation, so that the cover surface (31) of the screw cap (3), and the flange (22) of the spout element (2) are arranged in a direction pointing away from one another, and the screw cap (3) and the spout element (2) are brought into a joinable alignment to one another in an axially flush manner and the two parts are joined together.

8. A semi-finished product according to claim 7, wherein the two parts (2, 3) are joined together by a screw movement.

9. A semi-finished product according to claim 8, wherein the two parts (2, 3) are joined together by knocking together, and the threads (23, 32) slide over one another.

10. A semi-finished product according to claim 1, wherein separating locations (40) of the first breakage bridges (4) are recognizable on the outer side of the cover surface (31).

11. A semi-finished product according to claim 1, wherein a method for assembly of a plastic closure includes one part held or guided secure against rotation, the other part (2, 3) gripped, and the two parts (2, 3) rotated relative to one another for separating the first breakage bridges (4) and moved and held relative to one another while retaining a radial orientation, so that the cover surface (31) of the screw cap (3), and the flange (22) of the spout element (2) are arranged in a direction pointing away from one another, and the screw cap (3) and the spout element (2) are brought into a joinable alignment to one another in an axially flush manner and the two parts are joined together.

12. A semi-finished product according to claim 11, wherein the two parts (2, 3) are joined together by a screw movement.

13. A semi-finished product according to claim 12, wherein the two parts (2, 3) are joined together by knocking together, and the threads (23, 32) slide over one another.

* * * * *